US007079572B2

(12) United States Patent
Heise

(10) Patent No.: US 7,079,572 B2
(45) Date of Patent: Jul. 18, 2006

(54) METHOD FOR SETTING UP A DATA TRANSMISSION LINK BETWEEN XDSL TRANSCEIVERS

(75) Inventor: Bernd Heise, Munich (DE)

(73) Assignee: Infineon Technologies AG, Munich (DE)

( * ) Notice: Subject to any disclaimer, the term of this patent is extended or adjusted under 35 U.S.C. 154(b) by 797 days.

(21) Appl. No.: 10/215,107

(22) Filed: Aug. 8, 2002

(65) Prior Publication Data

US 2003/0133498 A1 Jul. 17, 2003

(30) Foreign Application Priority Data

Jan. 15, 2002 (DE) ................ 102 01 415

(51) Int. Cl.
*H04B 1/38* (2006.01)
(52) U.S. Cl. ........................................ 375/219
(58) Field of Classification Search ........... 375/219, 375/259, 354, 377, 224, 227, 229; 379/399.01; 370/310
See application file for complete search history.

(56) References Cited

U.S. PATENT DOCUMENTS

| 5,539,777 A | 7/1996 | Grube et al. |
| 5,852,631 A | 12/1998 | Scott |
| 6,052,411 A | 4/2000 | Mueller et al. |
| 6,104,749 A | 8/2000 | Lu et al. |

FOREIGN PATENT DOCUMENTS

WO  WO 98/10545 A1  3/1998

*Primary Examiner*—Pankaj Kumar
(74) *Attorney, Agent, or Firm*—Jenkins, Wilson, Taylor & Hunt, P.A.

(57) ABSTRACT

The invention relates to a method for setting up a data transmission link between xDSL transceivers in which the period for setting up the data transmission link is minimum. The method exhibits a very low susceptibility to interference. An XDSL transceiver with an echo cancellation circuit and an equalizer is also dislcosed.

14 Claims, 6 Drawing Sheets

METHOD FOR SETTING UP A DATA TRANSMISSION LINK BETWEEN XDSL TRANSCEIVERS

TECHNICAL FIELD

The invention relates to a method for setting up a data transmission link between xDSL transceivers with a minimum warm start period.

BACKGROUND ART

FIG. 1 shows a data transmission system according to the prior art. Between a transceiver at the switch end LTU (Line Terminating Unit) and a transceiver at the subscriber end NTU (Network Terminating Unit), the signaling data are first transmitted via a data transmission line for setting up a data transmission link for user data. The transceiver at the subscriber end NTU is a connecting socket which is installed in customer or subscriber premises by the network operator. The transceiver at the subscriber end NTU is connected to a data terminal, for example a computer. The transceiver at the switch end LTU is connected to a network, for example the telephone network. As a rule, the data transmission line is a copper telephone pair.

To set up a data transmission link, the two transceivers must be brought from a standby mode into an activated operating mode for the data transmission. In xDSL data transmission methods, the twisted analog telephone pairs are used as wide-band connections in the local loop. The most well-known xDSL data transmission methods are ADSL (Asymmetric DSL), VDSL (Very-High-Data-Rate DSL), SDSL (Symmetrical Single-Pair DSL).

After the completed cold start and subsequent deactivation, the two transceivers are initially in a power-saving or standby mode. In the power-saving mode, the transceivers consume minimum power so that the heat generated is minimum and no cooling is necessary.

Figure 1:
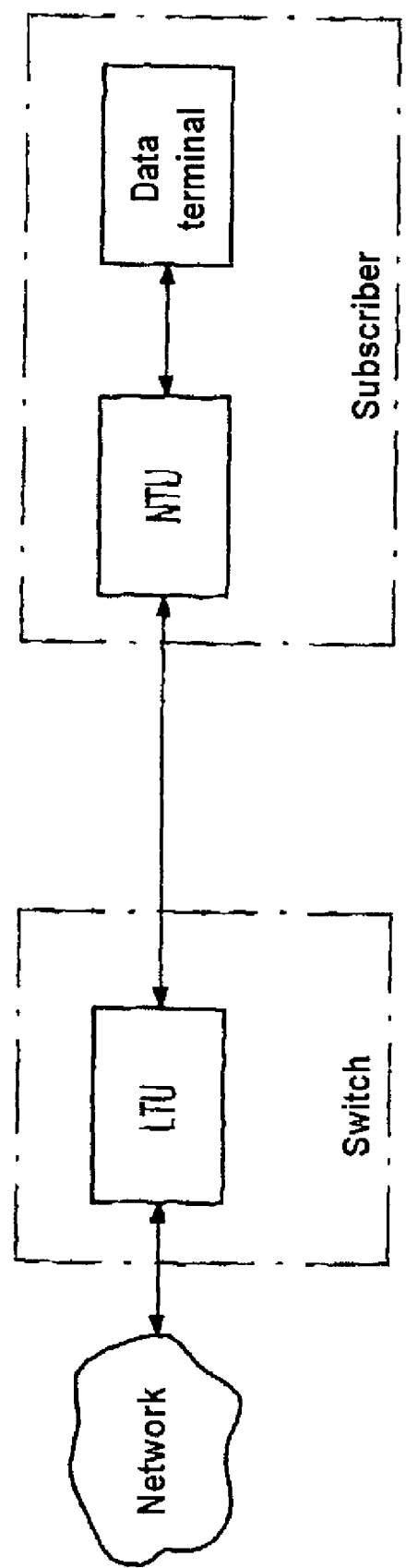

Initially, one of the two transceivers sends a wake-up signal via the data transmission line to the remote transceiver in order to activate the latter. In the sequence shown in FIG. 3, the transceiver at the subscriber end NTU sends a wake-up signal $W_{WUN}$ to the transceiver at the switch end LTU. After a predetermined interval $T_{WS}$, the transceiver at the switch end LTU also sends a wake-up signal $W_{WUL}$ back to the modem at the subscriber end NTU via the data transmission line. With this wake-up signal, the modem at the switch end LTU acknowledges reception of the original wake-up signal $W_{WUN}$.

After the wake-up sequence, it is determined in a line probing phase whether the line parameters of the data transmission line have changed since the last activation. For this purpose, the transceiver at the subscriber end NTU sends a line-probing signal $W_{LPN}$ via the transmission line to the transceiver at the switch end LTU in the example shown in FIG. 3. The transceiver at the switch end evaluates the received signal. After a predetermined waiting time $T_{WS}$, the transceiver at the switch end LTU conversely also sends a line-probing signal $W_{LPL}$ to the transceiver at the subscriber end NTU. The modem at the subscriber end NTU evaluates the received signal.

After the line parameters have been checked, a complete echo signal elimination may take place in a further phase. Since the last activation of the two transceivers, the line parameters of the data transmission line may have changed. This leads to a residual echo signal of the inherent transmit signal of a transceiver. The residual echo signal may impair the detection of a data signal received from the remote transceiver. The echo signal must, therefore, be canceled by echo signal elimination in such a way that it is below a predetermined threshold value. To eliminate the echo signal, the modem at the subscriber end NTU in the example shown in FIG. 3 sends out a signal for echo cancelation and the remote modem at the switch end LTU does not send out a signal. The echo cancelation circuit in the modem at the subscriber end NTU is set with the aid of the $W_{ECN}$ signal. After a predetermined waiting time $t_{WS}$ [sic], the modem at the switch end LTU then also sends out a signal $W_{ECL}$ for echo signal cancelation. During this time, the other modem NTU does not send out a signal. The echo cancelation circuit in the transceiver at the switch end LTU is adjusted to minimize the residual echo signal with the aid of the adjustment signal $W_{ECL}$.

After the echo signal elimination, synchronization is effected between the two transceivers in a synchronization sequence. The modem at the subscriber end NTU sends out a synchronization signal $W_{SN}$ for synchronizing the transceiver at the switch end LTU and conversely the modem at the switch end LTU sends out a synchronization signal $W_{SL}$ for synchronizing the modem at the subscriber end NTU. As soon as the two transceivers are synchronized, they in each case send an indicating signal to the other transceiver which indicates the completed synchronization. Following this, user data are transmitted between the two transceivers.

For a warm start between two transceivers, it is desirable that the period for the warm start $t_{warm\ start}$ is as short as possible. In the warm start sequence according to the prior art, the probing of the data transmission line, the echo signal elimination and the synchronization take place after one another or serially. A serious problem in this is that a predetermined worst-case time is in each case provided for probing the data transmission line and for eliminating the echo signal in the standard protocol for setting up the data transmission link. For this reason, the period for the warm start is relatively long in the warm start sequence according to the prior art.

SUMMARY OF THE INVENTION

It is, therefore, the object of the present invention to create a method for setting up a data transmission link between xDSL transceivers in which the period for setting up the data transmission link is minimum.

According to the invention, this object is achieved by a method according to the features specified in claim 1 and by an xDSL transceiver having the features specified in claim 14.

The invention creates a method for setting up a data transmission link between xDSL transceivers comprising the following steps: sending of an echo adjustment signal ($W_{ECL}$) by a first xDSL transceiver (1-1) to a second xDSL transceiver (1-2) until an echo cancelation circuit (21-1) of the first xDSL transceiver (1-1) is set, the second xDSL transceiver (1-2) synchronizing to the echo adjustment signal ($W_{ECL}$) and the second xDSL transceiver (NTU) not sending; sending of a first synchronization signal ($W_{SL}$) via the first xDSL transceiver (1-1) to the second xDSL transceiver (1-2) for synchronizing the second xDSL transceiver (1-2), the first synchronization signal ($W_{SL}$) being different from the echo adjustment signal ($W_{ECL}$); sending of a second synchronization signal ($W_{SN}$) by the second xDSL transceiver (1-2) to the first xDSL transceiver (1-1) for synchronizing the first xDSL transceiver (1-1) when the second xDSL transceiver (1-2) is completely synchronized by the first synchronization signal ($W_{SL}$), the second synchronization signal ($W_{SN}$) being sent by the second xDSL transceiver (1-2) to the first xDSL transceiver (1-1) until an echo cancelation circuit (21-2) of the second xDSL transceiver (1-2) is set, sending of a first indicating signal ($W_{OKN}$) by the second xDSL transceiver (1-2) to the first xDSL transceiver (1-1), which indicates to the first xDSL transceiver (1-2) that the echo cancelation circuit (21-2) of the second xDSL transceiver (1-2) is set and the second xDSL transceiver (1-2) is synchronized; and sending of a second indicating signal ($W_{OKL}$) by the first xDSL transceiver (1-1) to the second xDSL transceiver (1-2) which indicates to the second xDSL transceiver (1-2) that the first xDSL transceiver (1-1) is synchronized when the first xDSL transceiver (1-1) has received the first indicating signal ($W_{OKN}$).

An advantage of the method according to the invention consists in that it exhibits a very low susceptibility to interference because the various steps for setting up the data transmission link, namely probing of the data transmission line, echo signal elimination and synchronization in each case take place sequentially at the two transceivers and thus interfering mutual influence during the adjustments of the echo cancelation circuits of the equalizers and of the synchronization circuits are avoided.

Advantageous embodiments of the method according to the invention are specified in the subclaims.

The invention also creates an xDSL transceiver comprising a signal input for receiving digital user data, a signal generator for generating signaling data, a controllable multiplexer for switching through the generated signaling data or the user data in dependence on a control signal, a scrambler for scrambling the data switched through by the multiplexer, a mapping unit for mapping the scrambled data, a coder for coding the mapped data, a D/A converter for converting the coded data into an analog transmit signal, a hybrid circuit for connecting the xDSL transceiver via a data transmission line to a remote xDSL transceiver, an analog/digital converter for converting an analog received signal into a digital received signal, a detection circuit for detecting a received wake-up signal, a synchronization circuit for synchronizing to the received digital signal, an echo cancelation circuit for echo signal cancelation in the received digital signal, an equalizer for equalizing the received digital signal, a descrambler for descrambling the equalized received digital signal, and with a control unit, the control unit, after a received wake-up signal has been detected by the detection circuit or after a warm start request signal has been received, controlling the coder in such a manner that an echo adjustment signal $W_{ECL}$ is sent by the xDSL transceiver via the data transmission line, the control unit, after receiving a first indicating signal from the echo cancelation circuit ($W_{ECOK}$), which indicates that the echo cancelation circuit (EC) is set, driving the multiplexer in such a manner that a generated synchronization data sequence is switched through to the scrambler which is sent as synchronization signal ($W_{SL}$) by the xDSL transceiver via the data transmission line for synchronizing the remote xDSL transceiver, the control unit, after receiving a second indicating signal ($W_{SYNCOK}$) from the synchronization circuit, which indicates that the synchronization circuit is synchronized to a received digital signal and after receiving a third indicating signal ($W_{EQOK}$) from the equalizer (EQ), which indicates that the equalizer (EQ) is set, driving the multiplexer in such a manner that a generated synchronization data sequence is switched through to the scrambler which is sent as indicating signal ($W_{OK}$) by the xDSL transceiver via the data transmission line to the remote xDSL transceiver and indicates to the latter that the xDSL transceiver is ready for the data transmission of user data.

BRIEF DESCRIPITON OF THE DRAWINGS

Figure 2:
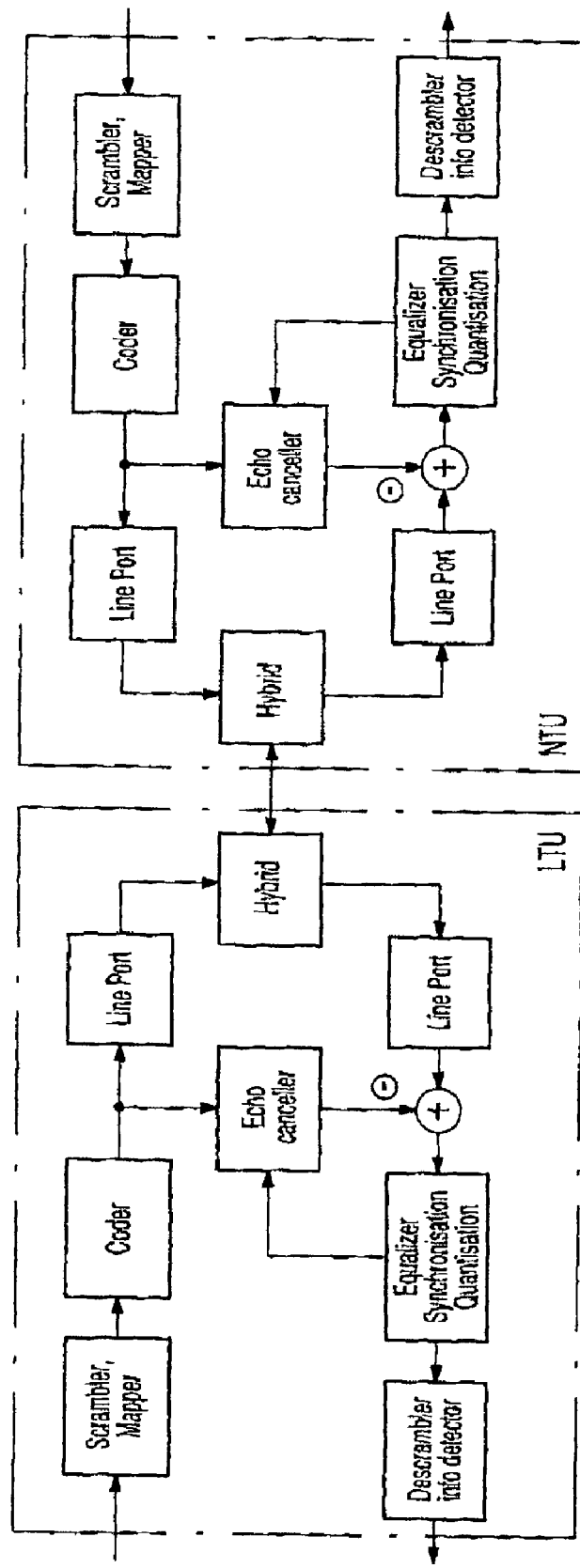
FIG. 2 shows a link between two transceivers LTU, NTU according to the prior art in detail. To set up a data link, the transceivers are reactivated in a warm-start sequence.
Figure 3:
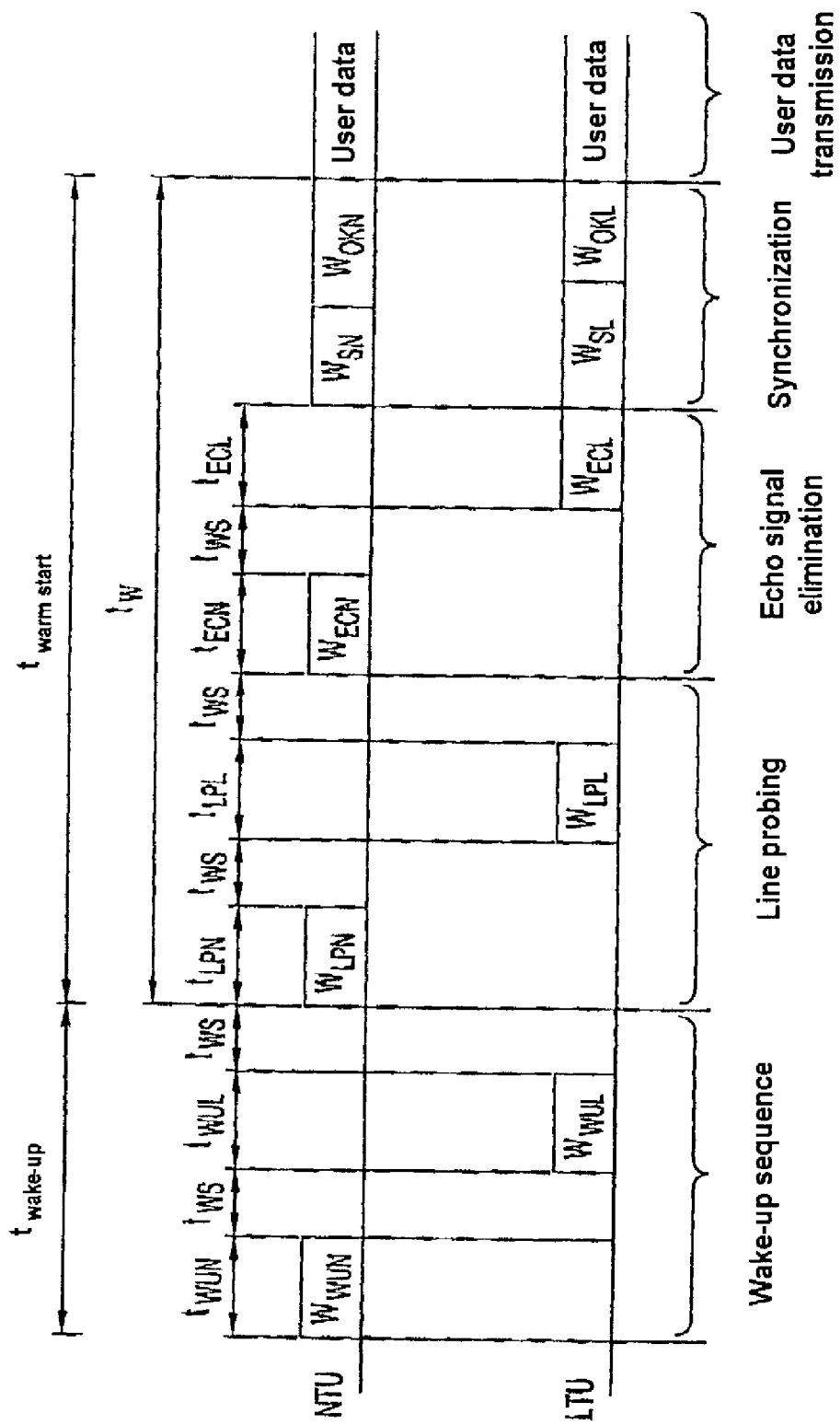
FIG. 3 shows a possible warm-start sequence according to the prior art, which is described in German Patent Application DE 101 39 779.8.
Figure 4:
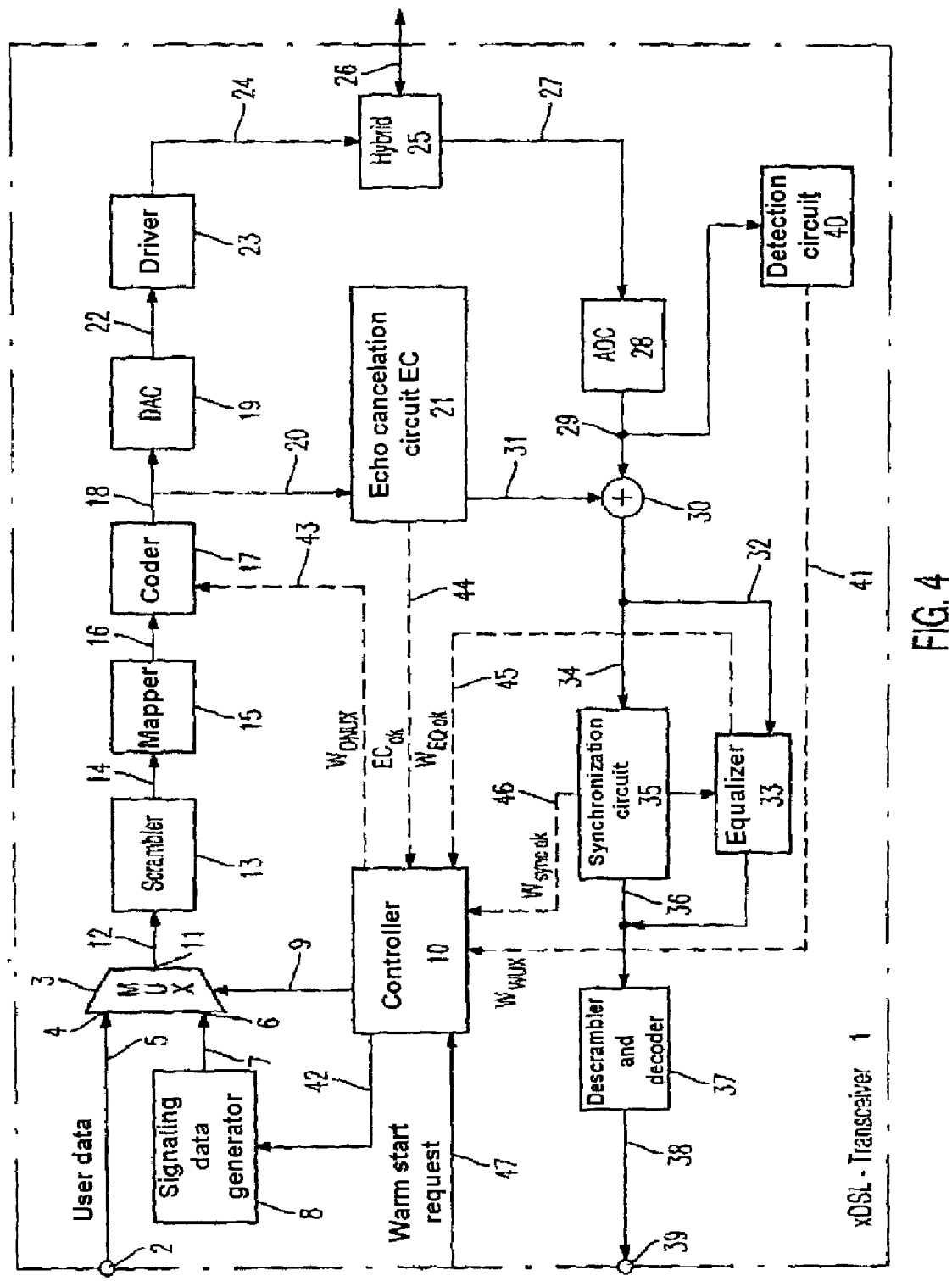
Figure 5:
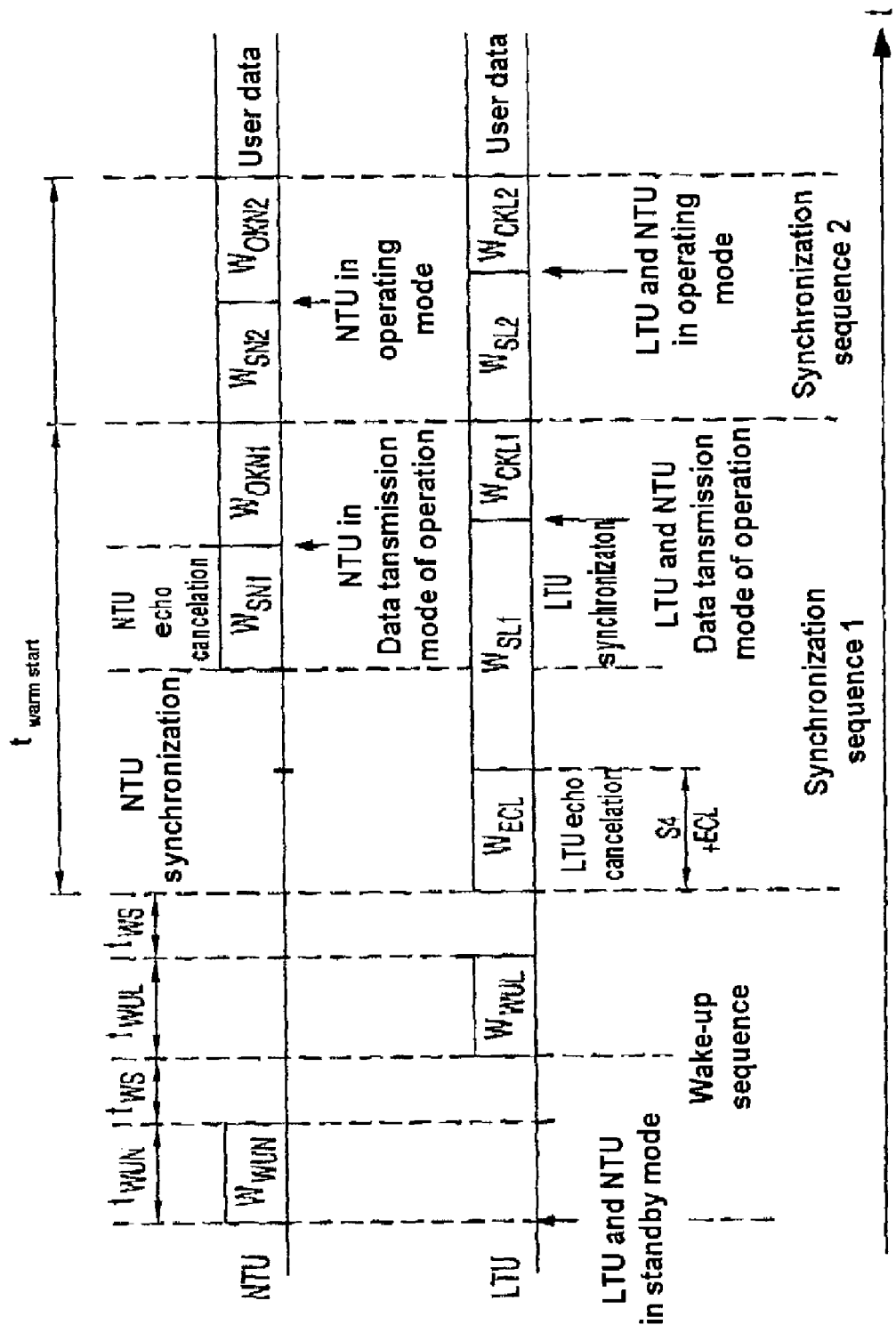
Figure 6:
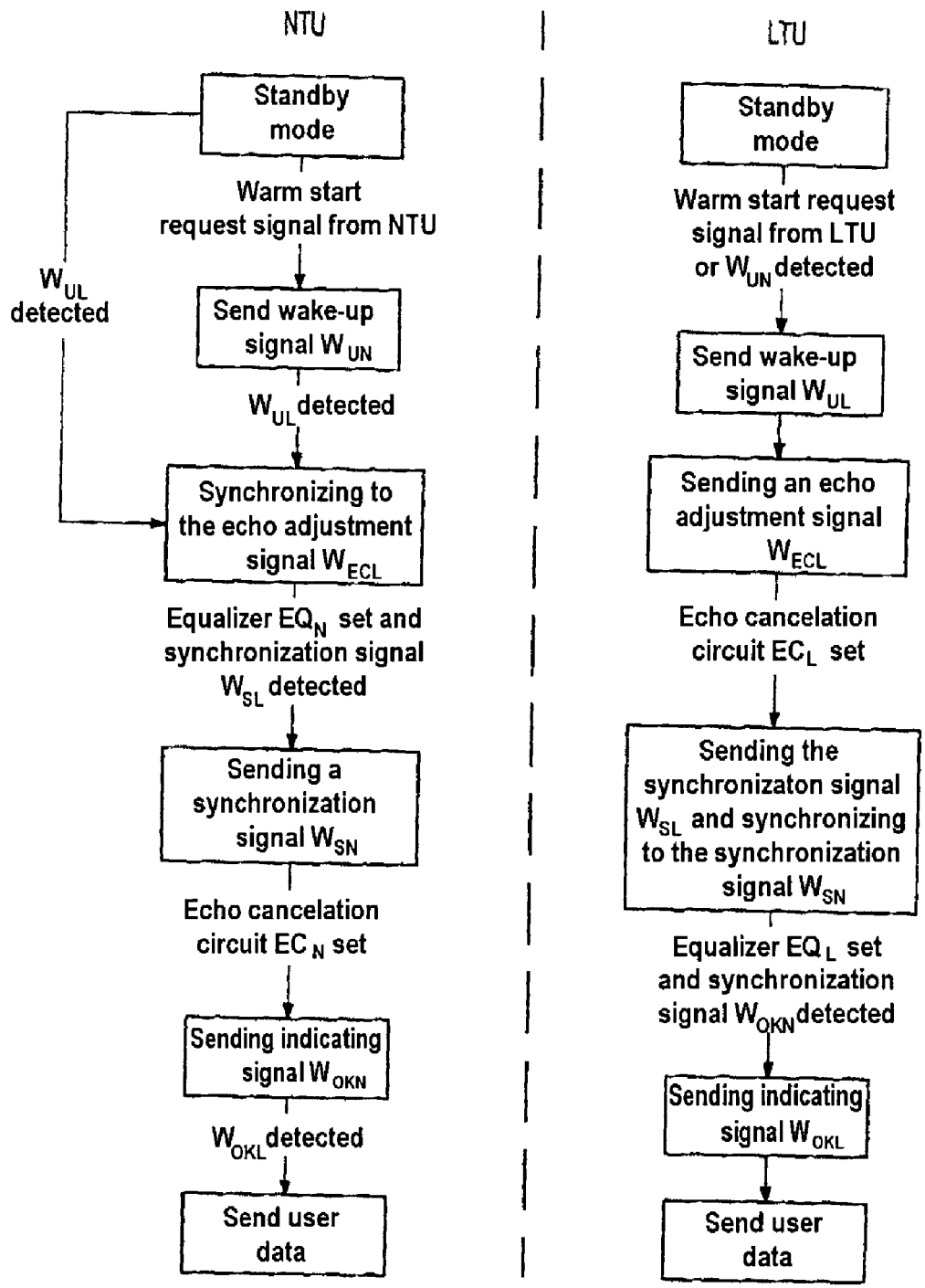

In the text which follows, preferred embodiments of the method according to the invention for setting up a data transmission link and of the xDSL transceiver according to the invention are described with reference to the attached figures for explaining features which are essential to the invention. In the figures:

FIG. 1 shows a data transmission link according to the prior art;

FIG. 2 shows a circuit configuration of conventional transceivers;

FIG. 3 shows a timing diagram which represents the setting-up of a data transmission link according to the prior art;

FIG. 4 shows a block diagram of an xDSL transceiver according to the invention;

FIG. 5 shows a flow chart for explaining the method according to the invention for setting up a data transmission link;

FIG. 6 shows a state diagram for explaining the method according to the invention for setting up a data transmission link between two xDSL transceivers.

DETAILED DESCRIPTION OF THE INVENTION

FIG. 4 shows a block diagram of the xDSL transceiver 1 according to the invention. The xDSL transceiver 1 has at least one signal input 2 for receiving digital user data. The digital user data come either from a data terminal or from a data network. The xDSL transceiver 1 also contains a controllable multiplexer 3. The controllable multiplexer 3 has a first input 4 which is connected to the signal input 2 for the user data via a line 5. In addition, the multiplexer 3 has a second input 6 which is connected to a signaling data generator 8 via a line 7. The multiplexer 3 is switched by an internal controller 10 of the xDSL transceiver 1 via a control line 9. The multiplexer 3 has a signal output 11 which is connected to a scrambler 13 via a line 12.

The output of the scrambler 13 is connected via a line 14 to a mapping unit 15 for mapping the scrambled digital data. The output of the mapping unit 15 is connected via a line 16 to a coder 17 for coding the mapped data.

In a preferred embodiment of the xDSL transceiver according to the invention, the coder 17 is a so-called Tomlinson coder. The coded data are passed to a digital/analog converter 19 via a line 18 and to an echo cancelation circuit 21 via a line 20. The digital/analog converter 19 converts the coded data present into an analog transmit signal which is applied to a driver circuit 23 of the xDSL transceiver 1 via an internal line 22. The driver circuit 23 amplifies the analog signal present and outputs the amplified signal to the hybrid circuit 25 via a line 24. The hybrid circuit 25 forms the connection between the xDSL transceiver 1 and the data transmission line 26. The data transmission line 26 is preferably a copper pair.

The hybrid circuit 25 is connected via a line 27 to an analog/digital converter 28 which converts the received analog signal into received digital data and outputs them to a subtracting unit 30 via a line 29. The subtracting unit 30 subtracts the output signal of the echo cancelation circuit 21, which is present via a line 31, from the received digital data. The subtracting unit 30 is followed by an equalizer 33 via a line 32. The equalizer is used for far-end signal recovery and equalizes the signal distortions occurring. The output signal of the subtracting unit 30 is output to a synchronization circuit 35 of the xDSL transceiver 1 via a line 34. The synchronization circuit 35 is used for synchronizing the xDSL transceiver 1 to a received signal. The synchronization circuit 35 is followed by a decoding and descrambler circuit 37 via a line 36. The decoder/descrambler 37 decodes and descrambles the equalized received data and outputs the descrambled data to a signal output 39 of the xDSL transceiver 1 via a line 38.

The xDSL transceiver 1 also contains a detection circuit 40 which is provided for detecting a received wake-up signal. The detection circuit 40 outputs a detection signal to the controller 10 via a line 41 when a wake-up signal or wake-up tone signal is received via the data transmission line 26. The controller 10 controls the signaling data generator 8 via a control line 42. In addition, the controller 10 controls the coder 17 via lines 43. The echo cancelation circuit 21 and the equalizer circuit 33 in each case indicate to the controller 10, via indicating lines 44, 45, that they are set in accordance with their own criteria. The echo cancelation circuit 21 indicates via the line 44 when it is converged, i.e. when the residual echo signal is below a threshold value.

The equalizer circuit 33 indicates to the controller 10 via the line 45 when the far-end signal is sufficiently equalized and the equalizer 33 is thus set.

In addition, the synchronization circuit 35 indicates to the controller 10 via a line 46 when adequate synchronization to the received data signal has taken place. In addition, the controller 10 can receive a warm start request signal via a line 47.

FIGS. 5, 6 show the sequence of the method according to the invention for setting up a data transmission link between two xDSL transceivers 1 according to the invention.

Initially, one of the two xDSL transceiver 1 sends a wake-up signal $W_{WUN}$ to wake up the other transceiver which acknowledges the reception of the wake-up signal by sending out a wake-up signal $W_{WUL}$.

After a certain waiting time $T_{WS}$, the synchronization sequence according to the invention begins with the setting-up of the data transmission link. In a step S1, a first xDSL transceiver 1-1 sends an echo adjustment signal $W_{ECL}$ to a second xDSL transceiver 1-2 until the echo cancelation circuit 21-1 of the first xDSL transceiver 1-1 is set, during which process the second xDSL transceiver 1-2 already synchronizes itself to this echo adjustment signal $W_{ECL}$. During this period, the second xDSL transceiver 1-2 is not sending a signal.

Once the echo cancelation circuit 21-1 is set, the xDSL transceiver 1-1 sends a synchronization signal $W_{SL}$, which differs from the echo adjustment signal $W_{ECL}$ and which indicates to the second xDSL transceiver 1-2 that the echo cancelation circuit 21-2 of the first xDSL transceiver 1-1 is set. For this purpose, the controller 10 drives the signaling data generator 8 via the control line 42 in such a manner that it applies a different signaling data sequence to the input 6 of the multiplexer 3 via the line 7. The multiplexer 3 is switched by the controller via the control line 9 in such a manner that the generated signaling data sequence is switched through to the output 11 of the multiplexer 11. The user data input 4 of the multiplexer 3 is blocked during this sequence. The signaling data sequence generated is scrambled by the scrambler 13 and then mapped by the mapping unit 15. The mapped signaling data present are coded by the coder 17 and converted into the first synchronization signal $W_{SL}$ by the digital/analog converter 19.

When the second xDSL transceiver 1-2 at the other end of the data transmission line 26 is completely synchronized by the first sychronization signal $W_{SL}$ and has recognized the first synchronization signal $W_{SL}$ as such by comparing it with the predetermined data bit sequence, the second xDSL transceiver 1-2 sends a second synchronization signal $W_{SN}$ to the first xDSL transceiver 1-1 for synchronizing the first xDSL transceiver 1-1. During this process, the second synchronization signal $W_{SN}$ is sent by the second xDSL transceiver 1-2 to the first xDSL transceiver 1-1 until the echo cancelation circuit 21-2 of the second xDSL transceiver is set.

The second xDSL transceiver 1-2 then sends to the first xDSL transceiver 1-1 a first indicating signal $W_{OKN}$ which indicates to the first xDSL transceiver 1-1 that the echo cancelation circuit 21-2 of the second xDSL transceiver 1-2 is set and the second xDSL transceiver 1-2 is synchronized. Conversely, the first xDSL transceiver 1-1 sends to the second xDSL transceiver 1-2 a second indicating signal $W_{OKL}$ which indicates to the second xDSL transceiver 1-2 that the xDSL transceiver 1-1 is synchronized when the first xDSL transceiver 1-1 has received the first indicating signal $W_{OKN}$.

In a preferred embodiment of the method according to the invention, the transmit signals are Tomlinson-coded by the coder 17. If no Tomlinson preceding takes place, a further synchronization sequence 2 may be required as shown in FIG. 5. The signals $W_{SN2}$, $W_{SL2}$, $W_{OKN2}$, $W_{OKL2}$ are here identical with the non-Tomlinson-precoded signals of the synchronization sequence 1 but the signals are Tomlinson-precoded in the synchronization sequence 2.

As can be seen by comparing the timing diagrams of FIG. 3 and FIG. 5, the warm start period $t_{warm\ start}$ required is much shorter in the method according to the invention for setting up a data transmission link, particularly with Tomlinson coding of the signaling data, than in the conventional method shown in FIG. 3.

In the method according to the invention, the echo adjustment signal $W_{ECL}$ is structured in such a manner that the remote transceiver 1 can already synchronize to it. In the method according to the invention, the echo adjustment signal $W_{EC}$ fulfills a dual function. On the one hand, the echo adjustment signal $W_{ECL}$ is used for adjusting the local echo cancelation circuit 21 and, on the other hand, for synchronizing the other xDSL transceiver 1 through its synchronization circuit 35. If necessary, the remote transceiver 1 is then completely synchronized by the first synchronization signal $W_{SL}$ sent which differs from the echo adjustment signal $W_{ECL}$. In contrast to the previous method, the time $t_{ECL}$ is not predetermined as a constant time in the method according to the invention. The echo adjustment signal $W_{ECL}$ is sent out by the xDSL transceiver 1 only until its echo cancelation circuit 21 is completely set and it indicates those to the controller 10 via the indicating line 44. The controller 10 then drives the signal data generator 8 via the control line 42 in such a manner that it generates another signaling data sequence for the first synchronization signal $W_{SL}$. In the method according to the invention, the echo signal elimination thus takes place within the synchronization sequence so that the necessary warm start period $t_{warm\ start}$ is considerably reduced in the method according to the invention.

FIG. 6 is used for explaining the method according to the invention and shows a state diagram of the two communicating transceivers NTU, LTU. The two transceivers are initially in a standby or power-saving mode. If the controller 10 of a transceiver receives a warm start request signal via the line 47 or detects a wake-up signal which originates from the connected other xDSL transceiver 1 via the data transmission line 26, the transceiver leaves the standby mode.

After the exchange of the wake-up signals, the modem at the switch end LTU sends an echo adjustment signal $W_{ECL}$ in the sequence shown in FIG. 6, to which the modem at the subscriber end NTU can already synchronize. The transceiver at the switch end NTU adjusts its echo cancelation circuit 21 by means of the echo adjustment signal $W_{ECL}$. Once the echo cancelation circuit 21 is set, this is reported to the controller 10 which drives the signal generator 8 to generate another signaling data sequence.

The transceiver 1 at the switch end LTU then sends a synchronization signal $W_{SL}$ via the data transmission line 26. The synchronization signal $W_{SL}$ adjusts the equalizer 35 of the other transceiver 1. After the equalizer 35 is set and the synchronization signal $W_{SL}$ is detected, the transceiver 1 at the subscriber end NTU changes into another operating mode and now sends a synchronization signal $W_{SN}$. This signal $W_{SN}$ is received by the transceiver at the switch end LTU and the transceiver LTU synchronizes to the received synchronization signal $W_{SN}$. During this sequence, the echo cancelation circuit $EC_N$ of the transceiver at the subscriber end NTU is adjusted.

After the echo cancelation circuit $EC_N$ is set, the transceiver at the subscriber end NTU sends an indicating signal $W_{OKN}$ via the data transmission line 26. If the equalizer 33 of the modem at the switch end LTU is set and the LTU transceiver detects the indicating signal $W_{OKN}$ of the other transceiver, it also sends an indicating signal $W_{OKL}$ to the opposite transceiver. Once the transceiver at the subscriber end NTU has detected the indicating signal $W_{OKL}$, both transceivers are ready for exchanging user data via the data transmission line 26.

The method according to the invention is a handshake method between the two xDSL transceivers 1. In this method, no timing conditions are predetermined a priori. The progress of activation of each transceiver is additionally controlled by the control signal from the remote transceiver in addition to the internal conditions achieved. During this process, the unwanted loss of time due to the exchange of information or control signals is minimized by parallel processing of the sequences. Both transceivers can adjust to their own echo cancellation circuit 21 without control signals from the opposite end. At the same time, the opposite end synchronizes and adapts itself.

The invention claimed is:

1. A method for setting up a data transmission link between a first xDSL transceiver and a second xDSL transceiver, comprising the following steps:
   a) sending of an echo adjustment signal by the first xDSL transceiver to the second xDSL transceiver until an echo cancelation circuit of the first xDSL transceiver is set, during which the second xDSL transceiver synchronizes itself to the echo adjustment signal and the second xDSL transceiver is not sending a signal;
   b) sending of a first synchronization signal via the first xDSL transceiver to the second xDSL transceiver for synchronizing the second xDSL transceiver, the first synchronization signal being different from the echo adjustment signal;
   c) sending of a second synchronization signal by the second xDSL transceiver to the first xDSL transceiver for synchronizing the first xDSL transceiver when the second xDSL transceiver is completely synchronized by the first synchronization signal and the first synchronization signal is detected as such, the second synchronization signal being sent by the second xDSL transceiver to the first xDSL transceiver until an echo cancelation circuit of the second xDSL transceiver is set,
   d) sending of a first indicating signal by the second xDSL transceiver to the first xDSL transceiver, which indicates to the first xDSL transceiver that the echo cancelation circuit of the second xDSL transceiver is set and the second xDSL transceiver is synchronized;
   e) and sending of a second indicating signal by the first xDSL transceiver to the second xDSL transceiver which indicates to the second xDSL transceiver that the first xDSL transceiver is synchronized when the first xDSL transceiver has received the first indicating signal.

2. The method as claimed in claim 1, wherein the echo cancellation circuit of the first xDSL transceiver and the echo cancellation circuit of the second xDSL transceiver are adjusted until a residual echo signal drops below a threshold value.

3. The method as claimed in claim 1, wherein the second xDSL transceiver does not send a signal as long as the first xDSL transceiver is sending the echo adjustment signal.

4. The method as claimed in claim 1, wherein an equalizer of the second xDSL transceiver is adjusted by the first synchronization signal and an equalizer of the first xDSL transceiver is adjusted by the second synchronization signal.

5. The method as claimed in claim 1, wherein for generating transmit signal, each of the first xDSL transceiver and the second xDSL transceiver are supplied with a corresponding digital signaling data sequence which is scrambled by a scrambler of the first xDSL transceiver the second xDSL transceiver, mapped by a mapping unit of the first xDSL transceiver the second xDSL transceiver, coded by a coder of the first xDSL transceiver or the second xDSL transceiver, converted into an analog signal by a digital/analog converter of the first xDSL transceiver or the second xDSL transceiver and amplified by a driver circuit of the first xDSL transceiver or the second xDSL transceiver to the transmit signal which is transmitted via a data transmission line.

6. The method as claimed in claim 1, wherein an analog signal, received from one of the first xDSL transceiver or the second xDSL transceiver by a data transmission line in each case amplified by a driver circuit of the first xDSL transceiver or the the second xDSL, is converted into a received digital signal by a digital/analog converter of the first transceiver or the second xDSL, has its echoes canceled by an echo cancelation circuit of the first xDSL transceiver or the second xDSL, is equalized by an equalizer of the first xDSL transceiver or the second xDSL, and descrambled by a descrambler of the xDSL transceiver for further data processing.

7. The method as claimed in claim 1, wherein the echo adjustment signal and the first synchronization signal are generated from different signaling data sequences.

8. The method as claimed in claim 1, wherein one of first xDSL transceiver and the second xDSL transceiver, after receiving a warm start request signal, is brought from a standby mode into a data transmission mode of operation.

9. The method as claimed in claim 8, wherein one of the first xDSL transceiver and the second xDSL transceiver brought into the data transmission mode of operation first sends a wake-up signal to one of the other of the first xDSL transceiver and the second xDSL transceiver via the data transmission line in order to also bring the same one of the other of the first xDSL transceiver and the second xDSL transceiver from the standby mode into a data transmission mode of operation.

10. The method as claimed in claim 1, wherein the data transmission link is set up when both the first xDSL transceiver and the second xDSL transceiver have been brought into a data transmission mode of operation.

11. The method as claimed in claim 1, wherein after one of the first synchronization signal and the second synchronization signal, user data signals are transmitted between the first transceiver and second xDSL transceivers via the data transmission link.

12. The method as claimed in claim 1, wherein the first synchronization signal and the second synchronization signal are coded with a Tomlinson code.

13. The method as claimed in claim 1, wherein the first synchronization signal and the second synchronization signal and the first indicating the second indicating signal form a synchronization sequence which can be repeated.

14. An xDSL transceiver comprising:
a signal input for receiving digital user data, a signal generator for generating signaling data, a controllable multiplexer for switching between the generated signaling data or the user data in dependence on a control signal,
a scrambler for scrambling the data switched through by the multiplexer,
a mapping unit for mapping the scrambled data,
a coder for coding the mapped data,
a D/A converter for converting the coded data into an analog transmit signal,
a hybrid circuit for connecting the xDSL transceiver via a data transmission line to a remote xDSL transceiver,
an analog/digital converter for converting an analog received signal into a digital received signal,
a detection circuit for detecting a received wake-up signal,
a synchronization circuit for synchronizing to the received digital signal,
an echo cancelation circuit for echo signal cancelation in the received digital signal,
an equalizer for equalizing the received digital signal,
a descrambler for descrambling the equalized received digital signal, and with a control unit,
wherein the control unit, after the received wake-up signal has been detected by the detection circuit or after a warm start request signal has been received, controls the coder in such a manner that an echo adjustment signal is sent by the xDSL transceiver via the data transmission line, wherein the control unit, after receiving a first indicating signal from the echo cancelation circuit, which indicates that the echo cancelation circuit is set, drives the multiplexer in such a manner that a generated synchronization data sequence is switched through to the scrambler which is sent as synchronization signal by the xDSL transceiver via the data transmission line for synchronizing the remote xDSL transceiver,
wherein the control unit, after receiving a second indicating signal from the synchronization circuit, which indicates that the synchronization circuit is synchronized to the received digital signal and after receiving a third indicating signal from the equalizer, which indicates that the equalizer is set, drives the multiplexer in such a manner that the generated synchronization data sequence is switched through to the scrambler which is sent as indicating signal by the xDSL transceiver via the data transmission line to the remote xDSL transceiver and indicates to the latter that the xDSL transceiver is ready for the data transmission of user data.

* * * * *